(12) United States Patent
Okada et al.

(10) Patent No.: US 11,915,024 B2
(45) Date of Patent: Feb. 27, 2024

(54) POOL MANAGEMENT FOR IN-VEHICLE DEVICE APPLICATION STARTUP

(71) Applicant: International Business Machines Corporation, Armonk, NY (US)

(72) Inventors: Masakuni Okada, Abiko (JP); Hayato Uenohara, Funabashi (JP); Takuya Matsunaga, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 16/930,874

(22) Filed: Jul. 16, 2020

(65) Prior Publication Data

US 2022/0019453 A1    Jan. 20, 2022

(51) Int. Cl.
*G06F 9/455* (2018.01)
*G06F 9/50* (2006.01)
(Continued)

(52) U.S. Cl.
CPC ............ *G06F 9/45558* (2013.01); *G06F 8/61* (2013.01); *G06F 8/65* (2013.01); *G06F 9/44505* (2013.01);
(Continued)

(58) Field of Classification Search
CPC .......... G06F 9/45558; G06F 8/61; G06F 8/65; G06F 9/44505–44584; G06F 9/5077; G06F 2009/4557
See application file for complete search history.

(56) References Cited

U.S. PATENT DOCUMENTS 9,239,814 B2   1/2016  Lagergren
9,507,612 B1*  11/2016 Henry ............... G06F 9/5027
(Continued)

FOREIGN PATENT DOCUMENTS

CN   103488495 A   1/2014
CN   108292233 A   7/2018

OTHER PUBLICATIONS

Adaptive Function Launching Acceleration in Serverless Computing Platforms Zhengjun Xu, Haitao Zhang, Xin Geng, Qiong Wu, and Huadong Ma (Year: 2019).*

(Continued)

*Primary Examiner* — Emerson C Puente
*Assistant Examiner* — Paul V Mills
(74) *Attorney, Agent, or Firm* — Grant M. McNeilly

(57) ABSTRACT

A method, a computer program product, and a system for pre-pooling virtual machine components prior to application startup. The method includes reading a virtual machine pool manifest by a virtual machine pool manager. The virtual machine pool manifest includes an initial number of virtual machines to launch, how many virtual machines to allocate resources to, and an amount of resources to allocate based on a virtual machine resource definition. The method also includes launching a plurality of base virtual machines into a virtual machine pool and based on the initial number provided by the virtual machine pool manifest. The base virtual machines lack initial application assignments. The method further includes allocating initial resources to a portion of the base virtual machines based on a virtual machine resource definition in the virtual machine pool manifest. The method includes loading core program packages into the portion of the base virtual machines.

20 Claims, 6 Drawing Sheets

(51) Int. Cl.
   *G06F 8/61* (2018.01)
   *G06F 9/445* (2018.01)
   *G06F 8/65* (2018.01)

(52) U.S. Cl.
   CPC .... *G06F 9/5077* (2013.01); *G06F 2009/4557* (2013.01)

(56) References Cited

U.S. PATENT DOCUMENTS

| | | | |
|---|---|---|---|
| 9,600,316 B2 | 3/2017 | Dournov | |
| 9,898,307 B2 | 2/2018 | Thiyagarajah | |
| 2007/0288224 A1* | 12/2007 | Sundarrajan | G06F 9/5072 703/22 |
| 2008/0201711 A1* | 8/2008 | Amir Husain | G06F 9/445 718/1 |
| 2011/0029970 A1* | 2/2011 | Arasaratnam | G06F 9/00 718/1 |
| 2013/0061221 A1* | 3/2013 | Anderson | G06F 9/45558 718/1 |
| 2013/0263123 A1 | 10/2013 | Zhou et al. | |
| 2015/0324216 A1 | 11/2015 | Sizemore | |
| 2016/0048409 A1 | 2/2016 | Briel | |
| 2016/0092250 A1* | 3/2016 | Wagner | G06F 9/44536 718/1 |
| 2016/0164797 A1* | 6/2016 | Reque | G06F 9/45533 718/1 |
| 2018/0129524 A1* | 5/2018 | Bryant | G06F 11/3006 |
| 2018/0239624 A1 | 8/2018 | Tsirkin | |
| 2018/0349183 A1* | 12/2018 | Popovic | H04L 41/0806 |
| 2018/0365036 A1 | 12/2018 | Toal et al. | |
| 2020/0007631 A1* | 1/2020 | Greenstein | H04L 43/0876 |
| 2020/0183744 A1* | 6/2020 | Kim | H04L 67/1008 |

OTHER PUBLICATIONS

Lightweight Virtualization as Enabling Technology for Future Smart Cars Roberto Morabito, Riccardo Petrolo, Valeria Loscri, Nathalie Mitton, Giuseppe Ruggeriz, and Antonella Molinaro (Year: 2017).*

Mitigating Cold Starts in Serverless Platforms—A Pool-Based Approach Ping-Min Lin and Alex Glikson (Year: 2019).*

A Feather-weight Virtual Machine forWindows Applications Yang Yu Fanglu Guo Susanta Nanda Lap-chung Lam Tzi-cker Chiueh (Year: 2006).*

PCT/IB2021/056289, International Search Report and Written Opinion dated Oct. 27, 2021.

"Method for Adaptive Application Preload with Customized Profiles," An IP.com Prior Art Database Technical Disclosure, IP.com No. IPCOM000180621D, Mar. 13, 2009, 11 pages.

Esfahbod, B., "Preload—An Adaptive Prefetching Daemon," Thesis, 2006, 81 pages.

Mell et al., "The NIST Definition of Cloud Computing", Recommendations of the National Institute of Standards and Technology, Special Publication 800-145, Sep. 2011, 7 pages.

IBM Embedded Automotive Platform (a.k.a. IBM Lotus Expeditor for Automotive) Introduction, Presentation, 2020, 6 pages.

* cited by examiner

POOL MANAGEMENT FOR IN-VEHICLE DEVICE APPLICATION STARTUP

BACKGROUND

The present disclosure relates to application startup speed in an in-vehicle device, and more specifically, to improving application startup speed by dividing the application launch process using efficient pool management techniques.

Information of Things (IoT) technology allows for function extensibility by providing the capability of adding additional applications into an in-vehicle device (e.g., a navigation system). Additionally, application development in vehicles is expanding to allow applications to control system functions (e.g., dashboard camera, air conditioner, vehicle information management) within a vehicle. These applications are developed as an integral part of the core functionality of an in-vehicle device allowing for system functions that can be installed as replaceable applications within the in-vehicle device.

SUMMARY

Various embodiments of the present disclosure are directed to a computer-implemented method of pre-pooling virtual machine components prior to application startup. The computer-implemented method includes reading a virtual machine pool manifest by a virtual machine pool manager. The virtual machine pool manifest includes an initial number of virtual machines to launch. The virtual machine pool manifest can also include how many virtual machines to allocate resources to, the number of resources to allocate based on a virtual machine resource definition, the number of virtual machines without a resource allocation, a default environment, and a parameter that indicates a maximum number of executable applications at a given time. The computer-implemented method also includes launching a plurality of base virtual machines into a virtual machine pool and based on the initial number provided by the virtual machine pool manifest. The base virtual machines lack initial application assignments. The computer-implemented method further includes allocating initial resources to a portion of the base virtual machines based on a virtual machine resource definition in the virtual machine pool manifest. The computer-implemented method includes loading core program packages into the portion of the base virtual machines.

Additional embodiments of the present disclosure include a computer program product of pre-pooling virtual machine components prior to the application startup, which can include a computer-readable storage medium having program instructions embodied therewith, the program instructions executable by a processor to cause the processor to perform a method. The method includes reading a virtual machine pool manifest by a virtual machine pool manager. The virtual machine pool manifest includes an initial number of virtual machines to launch. The virtual machine pool manifest can also include how many virtual machines to allocate resources to, the number of resources to allocate based on a virtual machine resource definition, the number of virtual machines without a resource allocation, a default environment, and a parameter that indicates a maximum number of executable applications at a given time. The method also includes launching a plurality of base virtual machines into a virtual machine pool and based on the initial number provided by the virtual machine pool manifest. The base virtual machines lack initial application assignments. The method further includes allocating initial resources to a portion of the base virtual machines based on a virtual machine resource definition in the virtual machine pool manifest. The method includes loading core program packages into the portion of the base virtual machines.

Further embodiments are directed to a virtual machine pool management system for pre-pooling virtual machine components prior to the application startup and configured to perform the methods described above. The present summary is not intended to illustrate each aspect of every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
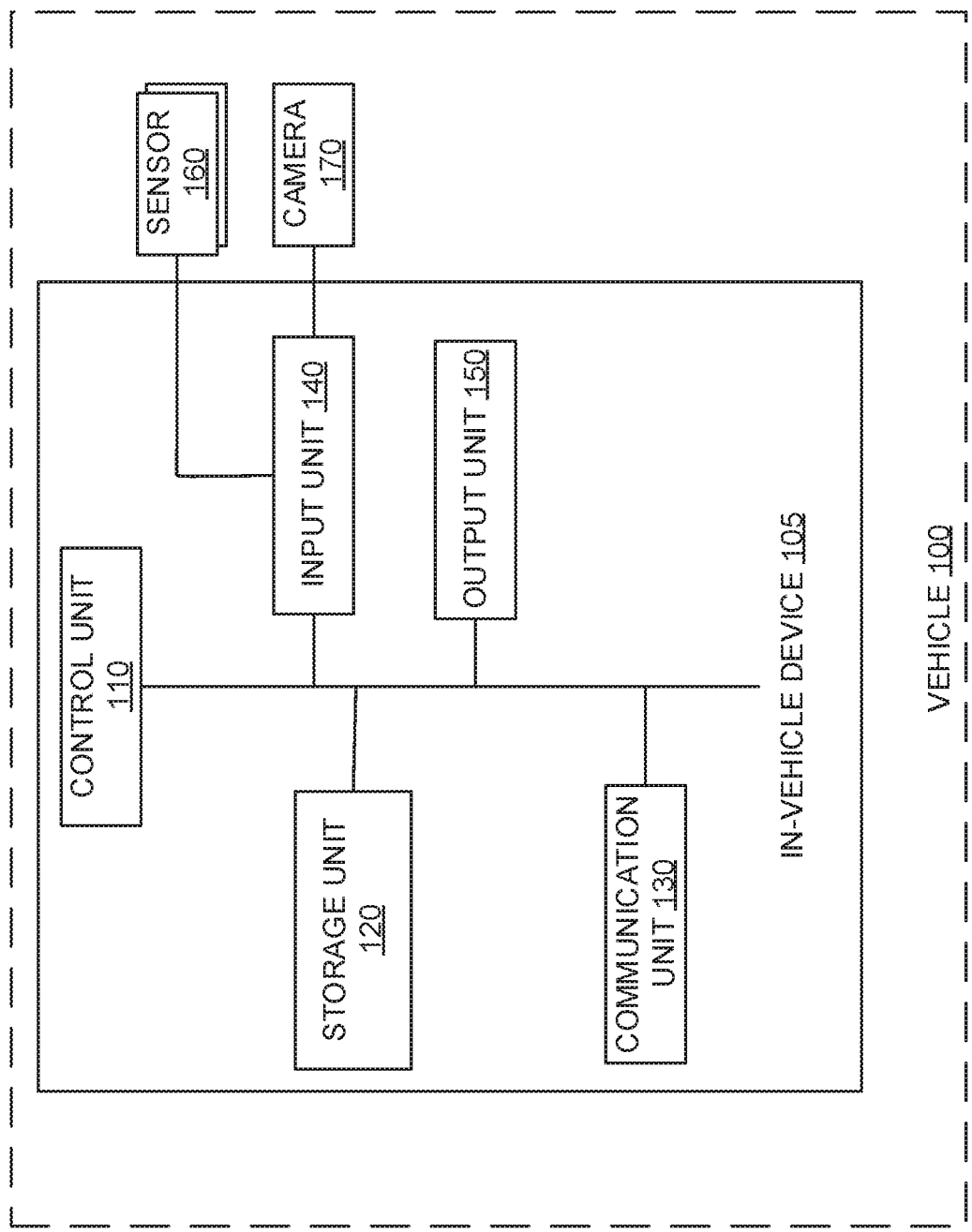
FIG. 1 is a block diagram illustrating an in-vehicle device in a vehicle, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to application startup speed in an in-vehicle device, and more specifically, to improving application startup speed by dividing the application launch process using efficient pool management techniques. While the present disclosure is not necessarily limited to such applications, various aspects of the disclosure may be appreciated through a discussion of various examples using this context.

Information of Things (IoT) technology allows for function extensibility by providing the capability of adding additional applications into a vehicle's in-vehicle device (e.g., a navigation system). Additionally, application development in vehicles is expanding to allow applications to control system functions (e.g., dashboard camera, air conditioner, vehicle information management) within a vehicle. These applications are developed as an integral part of the core functionality of an in-vehicle device allowing for system functions that can be installed as replaceable applications within the in-vehicle device.

A typical startup procedure for an in-vehicle application includes an application platform or a core program to operate an application, being initialized first. The initialization process includes reading an application from a storage device, generating a process, starting the core program of the application, and allocating resources required for the application. The application is started when control is shifted over to the application logic.

Limitations on application startup remain, however, as in-vehicle devices have limited resources (e.g., memory, storage, processor). Thus, in-vehicle applications can have a resource upper-limit restriction. Current techniques to accelerate application startup include technologies such as hibernation. In hibernation, the operating system can copy the running state of an application to memory before powering off. Accordingly, the operating system can restart the application by restoring the copy of the running state upon power-up. However, in vehicles, power interruption is triggered by an accessory off command, which may not provide the operating system an opportunity to create a copy of running states of all the applications that may be executing. Further, there is no distinction between different types of power-offs for in-vehicle devices, as opposed to traditional computing devices. For example, notebook computers can differentiate between power off commands. A power-off command from a press of the power button can elicit a different response from the notebook as opposed to a power-off command when the notebook is closed. Distinguishing between different types of power-offs can make it possible for the operating system on such devices to hibernate applications that are currently executing when a device is going to sleep as opposed to shutting down. Because in-vehicle devices cannot distinguish a sleep-type power-off event from a shutdown power-off event, for example, technologies such as hibernation are not applicable for in-vehicle devices.

Other techniques, such as hardware performance improvement and program run speed using ahead-of-time compilation (AOT), attempt to also accelerate application startup. However, these techniques may incur additional overhead costs and merely provide limited improvement to the overall startup speed of an in-vehicle application.

Embodiments of the present disclosure may overcome the above and other problems by using a virtual machine pool management system for pre-pooling virtual machine components prior to application startup. Additionally, resource allocation and application logic shifts are performed for an application. They are thereby allowing the application pool management system to accelerate the startup time of application in an in-vehicle device. The virtual machine pool management system includes a virtual machine pool manager configured to manage and launch virtual machines needed by an in-vehicle device. The virtual machine pool manager is also configured to allocate initial resources to the virtual machines based on a virtual machine pool manifest. The virtual machine pool management system also includes an application package manager configured to install and load core program packages into the virtual machines allocated with resources. These virtual machines can stay within a virtual machine pool and be in a ready state until they are requested by an in-vehicle device to execute an application.

In some embodiments, the virtual machine pool management system can launch additional virtual machines that do not receive an allocation of resources. The virtual machine pool management system can place these virtual machines into a wait configuration until such a time as they are needed. In this way, when resources become available, the virtual machine pool manager can allocate resources to the virtual machines in the wait configuration and place these virtual machines into a ready configuration.

In some embodiments, the virtual machine pool manager allocates initial resources to the virtual machines based on a resource assignment pattern. The resource assignment pattern may indicate a typical pattern an in-vehicle device has during operation. For example, an in-vehicle device may execute five applications immediately upon startup and then another six applications after a predetermined time. The resource assignment pattern can mimic the need of the in-vehicle device so to anticipate its need.

Embodiments of the present disclosure include an application life cycle manager configured to manage the life cycle of the applications being executed in an in-vehicle device. Additionally, the application life cycle manager can determine which virtual machines to assign applications to. This can be based on the initial resources and core programming loaded onto the virtual machine. For example, if a virtual machine is allocated with a sufficient amount of resources to allow for the operation and execution of a requested application, then the application life cycle manager can select that virtual machine and assign it that specific application. Otherwise, the application life cycle manager can request that the virtual machine pool manager launch additional virtual machines or reallocate appropriate resources.

Referring now to FIG. 1, shown is a high-level block diagram of a vehicle 100 with an embedded in-vehicle device 105. Additionally, the vehicle 100 includes a sensor 160, and a camera 170. The in-vehicle device 105 includes a control unit 110, a storage unit 120, a communication unit 130, an input unit 140, and an output unit 150. The input unit 140 is communicatively connected to the sensor 160 and the camera 170.

The in-vehicle device 105 is a component of the vehicle 100 configured to receive and transmit information relating to the vehicle 100. Additionally, the in-vehicle device 105 can operate vehicle system functions such as driving mode, cruise control, cameras, sensors, headlights, and the like. The in-vehicle device 105 can also operate various vehicle controls. These vehicle controls include, for example, navigation controls, heating, ventilation, and air conditioning (HVAC) controls, and audio/video (A/V) entertainment controls.

The control unit 110 is a component of the in-vehicle device 105 configured to use one or a plurality of central processing units (CPU) or a multi-core CPU and includes read-only memory (ROM), a random access memory (RAM), an input/output interface, a timer, and the like. The control unit 110 is a determining unit that controls operations of respective constituent units by executing a program stored in an embedded ROM, and executes the virtual machine pool management system 200 described below.

The storage unit 120 is a component of the in-vehicle device configured to store information pertaining to the vehicle 100 and the in-vehicle device 105. In some embodiments, the storage unit 120 is a non-volatile memory (e.g., flash memory, electrically erasable programmable read-only memory (EEPROM). The storage unit 120 can include one or more memories. Each of the memories in the storage unit 120 is, for example, a semiconductor memory, a magnetic memory, solid-state memory, or optical memory. Each memory functions, for example, as the main storage device, an auxiliary storage device, or a cache memory. The storage unit 120 can store any information used for the operation of the in-vehicle device 105. For example, the storage unit 120 can store applications executable by the in-vehicle device 105.

The communication unit 130 is a component of the in-vehicle device 105 configured to communicate data with a server. The communication device 130 has one or more communication modules. The communication module includes, for example, a module compatible with mobile communication standards such as the $4^{th}$ generation (4G), the $5^{th}$ generation (5G), Bluetooth, Wi-Fi, global system for mobile (GSM), code division multiple access (CDMA), long-term evolution (LTE), infrared (IR), and the like. In addition, the communication unit can have a communication device, such as a data communication module (DCM). The communication unit 130 connects to the in-vehicle device 105 to a network to communicate with a server. In some embodiments, the communication unit 130 includes a communication module that is a global positioning system (GPS) receiving module, in which the in-vehicle device 105 receives GPS signals by the communication unit 130.

The input unit 140 is a component of the in-vehicle device 105 that is an interface that inputs a signal from the outside of the in-vehicle device 105. The input unit 140 can receive information a sensor 160 or a camera 170, and the control unit 110 can acquire the information from the sensor 160 and the camera 170.

The output unit 150 is a component of the in-vehicle device configured to output a signal indicating an operation functionality the vehicle 100 is capable of. In some embodiments, the output unit 150 is a communication unit 130 connected to a local area network (LAN) or can be a communication unit 130 in combination with the input unit 140.

It is noted that FIG. 1 is intended to depict the major representative components of an exemplary in-vehicle device 105. In some embodiments, however, individual components may have greater or less complexity than as represented in FIG. 1, components other than or in addition to those shown in FIG. 1 may be present, and the number, type, and configuration of such components may vary.

Figure 2:
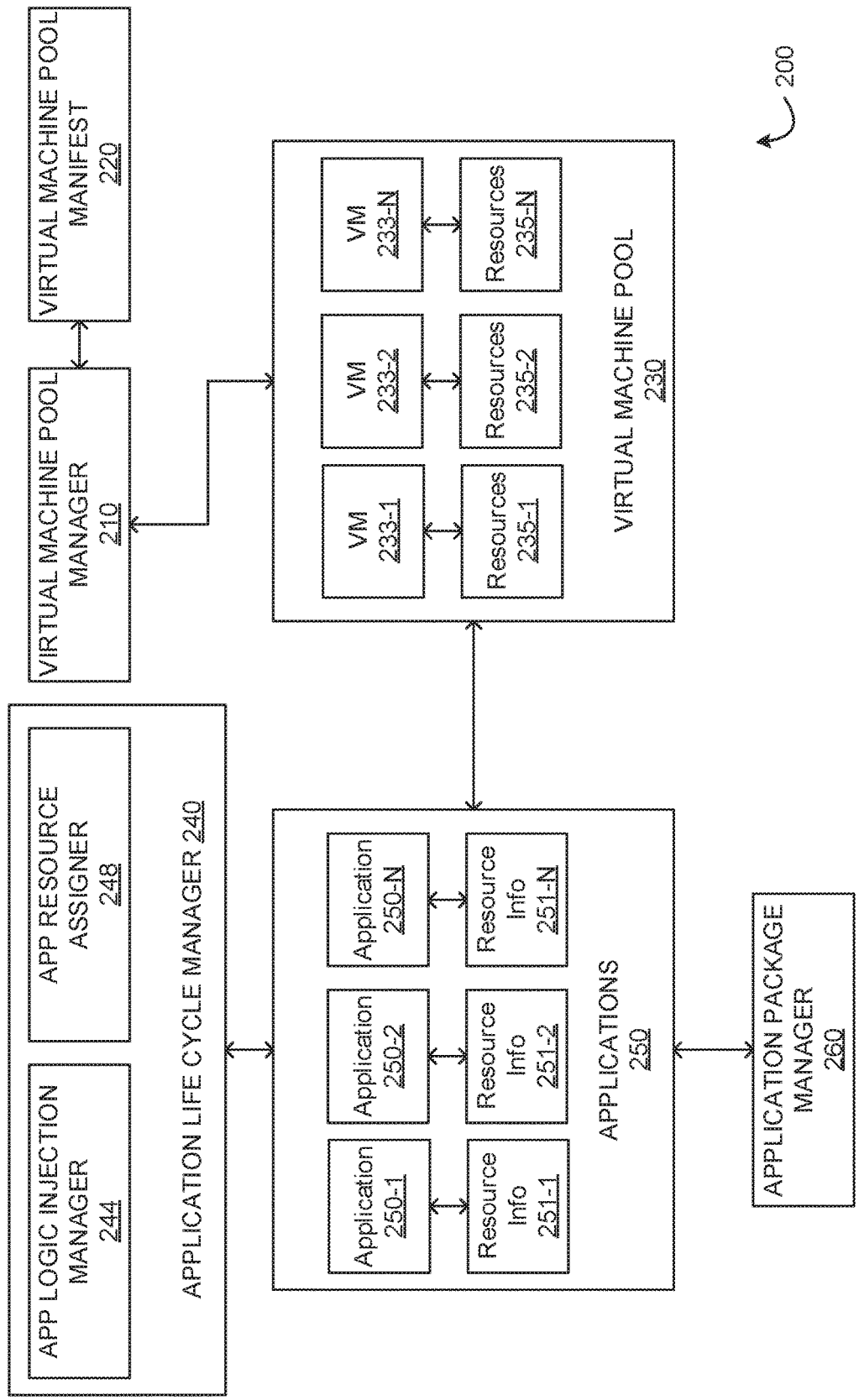
FIG. 2 is a block diagram illustrating a virtual machine pool management system, in accordance with embodiments of the present disclosure.

FIG. 2 is a block diagram illustrating a virtual machine pool management system 200 for pre-pooling virtual machine components prior to the application startup, in accordance with embodiments of the present disclosure. The virtual machine pool management system 200 includes a virtual machine pool manager 210, a virtual machine pool manifest 220, a virtual machine pool 230, application life cycle manager 240, applications 250-1, 250-2, 250-N (collectively "applications 250"), where N is a variable integer representing any number of possible applications 250, and an application package manager 260. The virtual machine pool includes base virtual machine 233-1, 233-2, 233-N (collectively "base virtual machines 233"), where N is a variable integer representing any number of possible base virtual machines 233, and resources 235-1, 235-2, 235-N (collectively "resources 235"), where N is a variable integer representing any number of possible resources 235. The application lifecycle manager 240 includes an application logic injection manager 244 and an application resource assigner 248. The applications 250 include resource information 251-1, 251-2, 251-N (collectively "resource information 251"), where N is a variable integer representing any number of possible resource information 251.

The virtual machine pool manager 210 is a component of the virtual machine pool management system 200 configured to manage and launch virtual machines. The virtual machine pool manager 210 is responsible for resource management of the virtual machines. It can maintain a list of which designated applications 250 run on which base virtual machines 233. For example, the list can have an entry that designates that navigation software runs on navigation specific virtual machines and another entry that designates that non-user interface (UI) applications run on non-UI specific virtual machines.

The virtual machine pool manager 210 can run a series of virtual machine management utilities. These utilities include, for example, functions that: create, destroy, put to sleep, and wake up virtual machines. The utilities can also maintain a list that matches applications to virtual machines.

The virtual machine pool manifest 220 is a component of the virtual machine pool management system 200 configured to provide initial virtual machine establishment requirements. The virtual machine pool manifest 220 can include an initial number of base virtual machines 233 to be placed in the virtual machine pool 230. For example, the initial number may indicate that seven base virtual machines 233 are required at startup. Additionally, the virtual machine pool manifest 220 can include the number of base virtual machines 233 that are to be allocated with resources 235.

In some embodiments, the virtual machine pool manifest 220 indicates an allocation of resources 235 based on a resource definition. A resource definition defines the type of resources needed basing on the type of application loaded to the virtual machine 233. For example, a resource definition may indicate the resources needed for a display buffer. A display buffer can indicate that an application requires the use of a UI. Applications that may require UIs include, for example, navigation, radio, system settings, speedometer, and the like. Another resource definition may indicate that a display buffer is not used, which may be indicative of fewer resources being needed for a particular application. These types of applications may be background related applications that an in-vehicle device 105 may use during the operation of a vehicle 100.

In some embodiments, the virtual machine pool manifest 220 includes a default environment resource assignment. The default environment resource assignment may include a default allocation of resources when a resource definition is not defined for a particular virtual machine. The default resource assignment can indicate the amount of memory, storage, and CPU usage to be allocated to a default base virtual machine 233.

In some embodiments, the virtual machine manifest 220 includes a parameter indicating a threshold number of applications an in-vehicle device 105 can have running at any given time. The threshold number can be based on the resources available to the in-vehicle device 105 and manageable by the virtual machine pool management system 200.

The virtual machine pool 230 is a component of the virtual machine pool management system 200 configured to store base virtual machines 233. The virtual machine pool 230 can be any storage capable of storing software. In some embodiments, the virtual machine pool 230 stores a single virtual machine that can be configured by the virtual machine pool manager 210. The virtual machine pool 230 can store any number of distinct base virtual machines 233 that can be configured by the virtual machine pool manager 210.

The base virtual machines 233 are components of the virtual machine pool management system 200 configured to mimic the performance of a device (e.g., a computer). The base virtual machines 233 can be retrieved from the virtual machine pool 230. The base virtual machines 233 include resources 235 required to operate the base virtual machines 233. For example, the resources include the amount of memory, storage, and CPU usage required by the base virtual machines 233. Additionally, the base virtual machines 233 can also include a core program package loaded onto the base virtual machines 233 once they are launched onto the virtual machine pool 230. The core program package can provide a base operating system required to support and execute the applications 250 as well as various application components included in the base virtual machines 233.

In some embodiments, the base virtual machines 233 include a client that corresponds with a server. The client can communicate with the server via the base virtual machines 233 to create, clone, or otherwise access a virtual machine instance according to the various configuration definitions included in the virtual machine pool manifest 220.

The application life cycle manager 240 is a component of the virtual machine pool management system 200 configured to manage the life cycle of the applications 250. The application life cycle manager 240 can request a base virtual machine 233 to load an application on. Additionally, the application life cycle manager 240 can determine which applications are loaded in the order in which the applications are loaded. In some embodiments, the application life cycle manager 240 requests additional base virtual machines 233 to be added to the virtual machine pool 230. For example, numerous applications 250 can be in operation, and to avoid a slowdown in operation, the application life cycle manager 240 can request base virtual machines 233 in wait mode be allocated resources and loaded with core program packages. Additional base virtual machines 233 can also be launched within the virtual machine pool 230 and placed in a wait mode configuration. These base virtual machines 233 may not have assigned resources or program logic.

The application logic injection manager 244 is a component of the application life cycle manager 240 configured to load unique application logic onto the base virtual machines 233. The application logic injection manager 244 can identify the application 250 that is to be loaded onto a base virtual machine 233 and load application-specific information to allow for the execution of the application 250. For example, application classes can be loaded, and injection points can be attached to receptors in the base virtual machine 233.

The application resource assigner 248 is a component of the application life cycle manager 240 configured to allocate resources required by an application 250 onto a virtual machine 233. The application resource assigner 248 can compare the initial resources allocated to a base virtual machine 233 with the resource information 251 of an application 250 that is being loaded onto the virtual machine 233. If the resources 235 differ, then the application resource assigner 248 can reallocate resources to the virtual machine 233. For example, a base virtual machine 233 may include 50 megabytes of storage and an application 250 is loaded onto the base virtual machine 233 requires 65 megabytes of storage, then the application resource assigner 248 can reallocate at least 65 megabytes of storage to the base virtual machine 250 to allow the application to be loaded and executed.

In some embodiments, if the initial resources adequately provide enough resources based on the resource information 251 for an application 250, then the application resource assigner 248 does no reallocate any resources. In some embodiments, if the initial resources adequately provide enough resources based on the resource information 251 for an application 250, then the application resource assigner 248 evaluates the resources and deallocates any unnecessary resources. For example, if the initial resources include 200 kilobytes of memory and the application 250 only requires 100 kilobytes of memory, then the application resource assigner 248 can deallocate at most 100 kilobytes of memory from the virtual machine 233.

The applications 250 are software of the virtual machine pool management system 200 that are capable of being executed by an in-vehicle device 105. The applications include features such as telematics services, road information, traffic information, weather information, fleet management, health checks, emergency assistance, music/video, insurance, news, and infotainment. Each application 250 additionally includes resource information 251 relating to the application 250. The resource information 251 can include the number of resources required to execute and operate a particular application 250. For example, an application 250 that provides weather information may require a certain amount of memory, storage, an CPU usage that the resource information 251 can store.

The application package manager 260 is a component of the virtual machine pool management system 200 configured to install and update applications 250 provided by the virtual machine pool management system 200. The application package manager 260 can automate the process of installing, upgrading, configuring, and removing applications 250 from an in-vehicle device 105. The application package manager 260 can deal with packages that are distributions of software and data in archive files. Packages can contain metadata, such as an application's 250 name, description of its purpose, version number, vendor, checksum, and a list of dependencies necessary for the application 250 to run properly (e.g., resource information 251). Upon installation, metadata can be stored in a local package database. The application package manager 260 can maintain a database of application 250 dependencies and version information to prevent software mismatches and missing prerequisites.

It is noted that FIG. 2 is intended to depict the major representative components of an exemplary virtual machine pool management system 200. In some embodiments, however, individual components may have greater or less complexity than as represented in FIG. 2, components other than or in addition to those shown in FIG. 2 may be present, and the number, type, and configuration of such components may vary.

Figure 3:
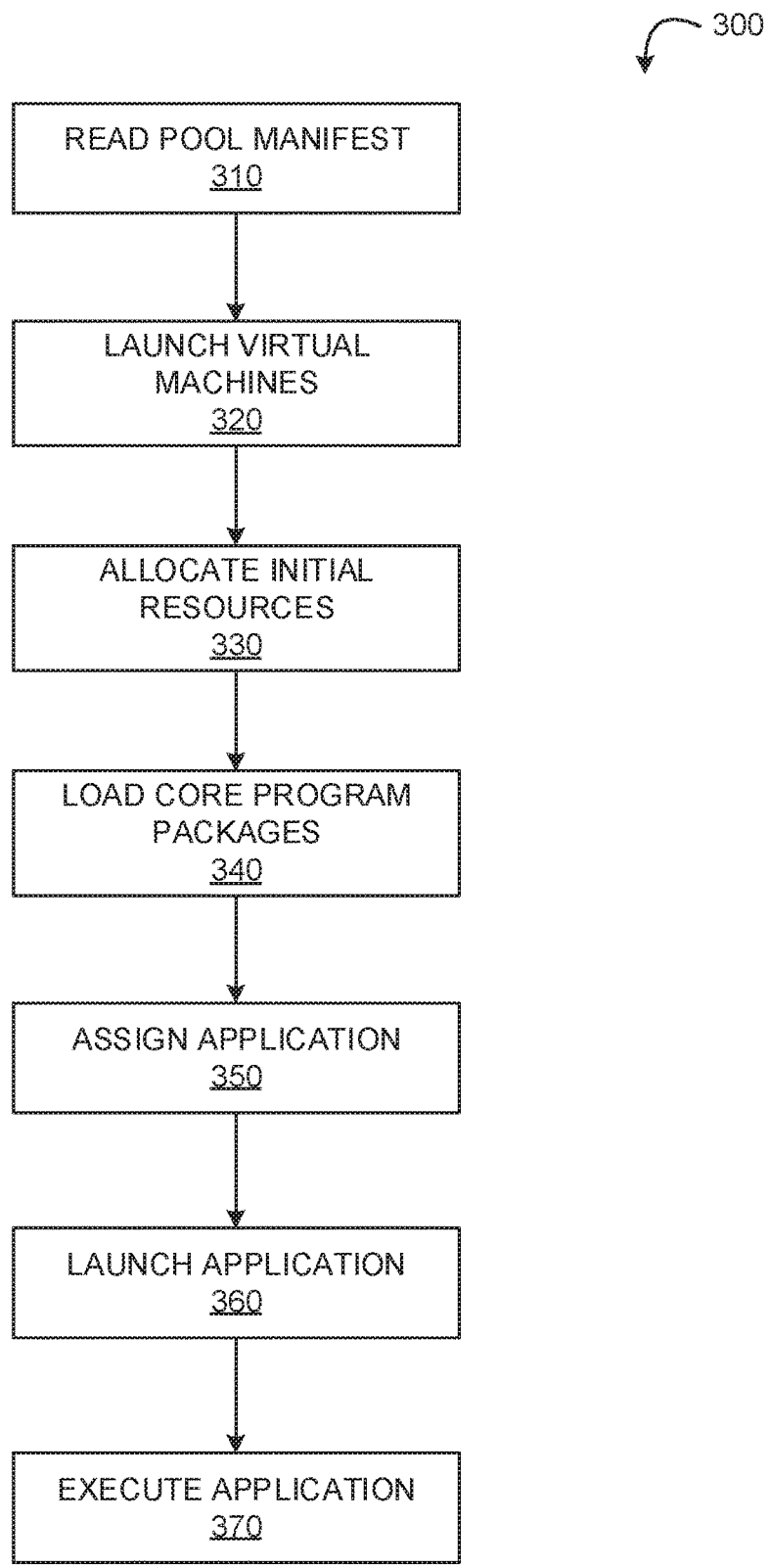
FIG. 3 is a flow diagram of pre-pooling virtual machine components prior to application startup, in accordance with embodiments of the present disclosure.

FIG. 3 is a flow diagram illustrating a process 300 of pre-pooling virtual machine components prior to application startup, in accordance with embodiments of the present disclosure. The process 300 begins by the virtual machine pool manager 210 reading the virtual machine pool manifest 220 upon initiation of the virtual machine pool management system 200. This is illustrated at step 310. The virtual machine pool manager 210 can read the initial virtual machine 233 requirements. These requirements can include, for example, an initial number of base virtual machines 233 to be placed in the virtual machine pool 230, an allocation of resources 235 for each virtual machine 233 based on a resource definition, a default environment resource assignment, and a parameter indicating a maximum number of applications an in-vehicle device 105 can have running at any given time.

The virtual machine pool manager 210 launches base virtual machines 233 into the virtual machine pool 230, as indicated in the virtual machine pool manifest 220. This is illustrated at step 320. The virtual machine pool 230 can store any number of distinct base virtual machines 233 that can be configured by the virtual machine pool manager 210. Upon launch, the base virtual machines 233 lack a resource allocation and do not have core program packages loaded. In some embodiments, the base virtual machines 233 are launched according to a timeline indicated by the virtual machine pool manifest 220. For example, the virtual machine pool manifest 220 may indicate that twelve base virtual machines 233 are launched upon initiation, and then another five base virtual machines 233 are to be launched after a predetermined time. This series of predetermined launches of base virtual machines 233 can occur as many times as the virtual machine pool manifest 220 is configured to do.

The virtual machine pool manager 210 allocates initial resources 235 to a portion of the base virtual machines 233 launched at step 320. This is illustrated at step 330. The base virtual machines 233 that are allocated with resources 235 can be predetermined by the virtual machine pool manifest 220. The number of base virtual machines 233 that are also allocated resources can also be an optimized number based on the number of applications 250 that are required by a vehicle 100 upon startup. These applications include, for example, as telematics services, road information, traffic information, weather information, fleet management, health checks, emergency assistance, music/video, insurance, news, and infotainment. The remaining portion of base virtual machines 233 can be placed in a wait configuration until such a time as to when they are needed.

By having base virtual machines 233 placed in a wait configuration, the virtual machine pool management system 200 need not spend additional time launching a virtual machine 233 when an application 250 is required to be launched. Additionally, not all of the base virtual machines 233 that are allocated with resources 235 may not be assigned an application immediately, and instead can act as a buffer during operation of the in-vehicle device 105. As base virtual machines 233 are requested and used by applications 250, more virtual machines can be launched into the virtual machine pool 230 to maintain a buffer and speed up the startup process of an application 250.

The application package manager 260 loads core program packages onto the portion of base virtual machines 233 allocated with resources 235. This is illustrated at step 340. The core program packages can include a Java virtual machine environment without application logic. Other core program packages include, for example, virtual machine base code, class libraries (e.g., Java), service application programming interface (API), and UI life cycle management software. The core program packages can include receptors that can represent shells for application logic to load into. Once a virtual machine 233 has been allocated resources 235 and loaded with core program packages, it is placed into a ready configuration and can be assigned and loaded with an application.

The application life cycle manager 240 assigns an application 250 a base virtual machine 233 that is in a ready configuration. This is illustrated at step 350. In some embodiments, the application life cycle manager 240 determines which applications are loaded in the order in which the applications are loaded. The order in which the application life cycle manager 240 selects and assigns an application 250 can be based on needing an urgency of an application 250 needed by an in-vehicle device 105. For example, an application 250 that provides system diagnostics upon startup of a vehicle 100 can be assigned a virtual machine 233 prior to an application 250 that provides infotainment to a passenger.

In some embodiments, the application life cycle manager 250 assigns an application to a base virtual machine 233 in a ready configuration based on the application type relating to the application 250 being launched. For example, an application 250 that does not require a UI may be launched first because the resources information 251 of the application 250 matches that of the initial resources 235 allocated to the base virtual machine 233. Thus, no additional resources 235 need to be reallocated to the virtual machine 233, and the application 250 can launch faster than an application 250 that may require additional resources.

The application logic injection manager 244 launches the application 250 in the base virtual machine 233. This is illustrated at step 360. Application logic includes, for example, application-specific classes, methods, and additional code. The application logic injection manager 244 can load application logic relating to the application 250 into the virtual machine 233. Additionally, the injection points can be attached to the receptors included in the virtual machine 233 that were loaded with the core program packages.

In some embodiments, the application resource assigner 248 analyzes the resource information 251 of the application 250 and initial resources 235 assigned to the virtual machine 233. Based on the analysis, the application resource assigner can reassign resources 235 to the virtual machine 233 to allow the application to launch successfully. For example, if the initial resources 235 contain 45 kilobytes of available memory and the application 250 is launched requires 100 kilobytes of memory, then the application resource assigner 248 can reallocate additional memory to the virtual machine 233 so that the application 250 can properly launch.

In some embodiments, the application resource assigner 248 analyzes the resource information 251 of the application 250 and initial resources 235 assigned to the virtual machine 233. Based on the analysis, the application resource assigner can reassign unneeded resources 235 back to a resource pool. Once the application 250 has the application logic loaded and injection points attached, the application life cycle manager 240 executes the application 250. This is illustrated at step 370. The application life cycle manager 240 can monitor the application 250 during operation and execution and determine if and when to terminate the application 250.

Figure 4:
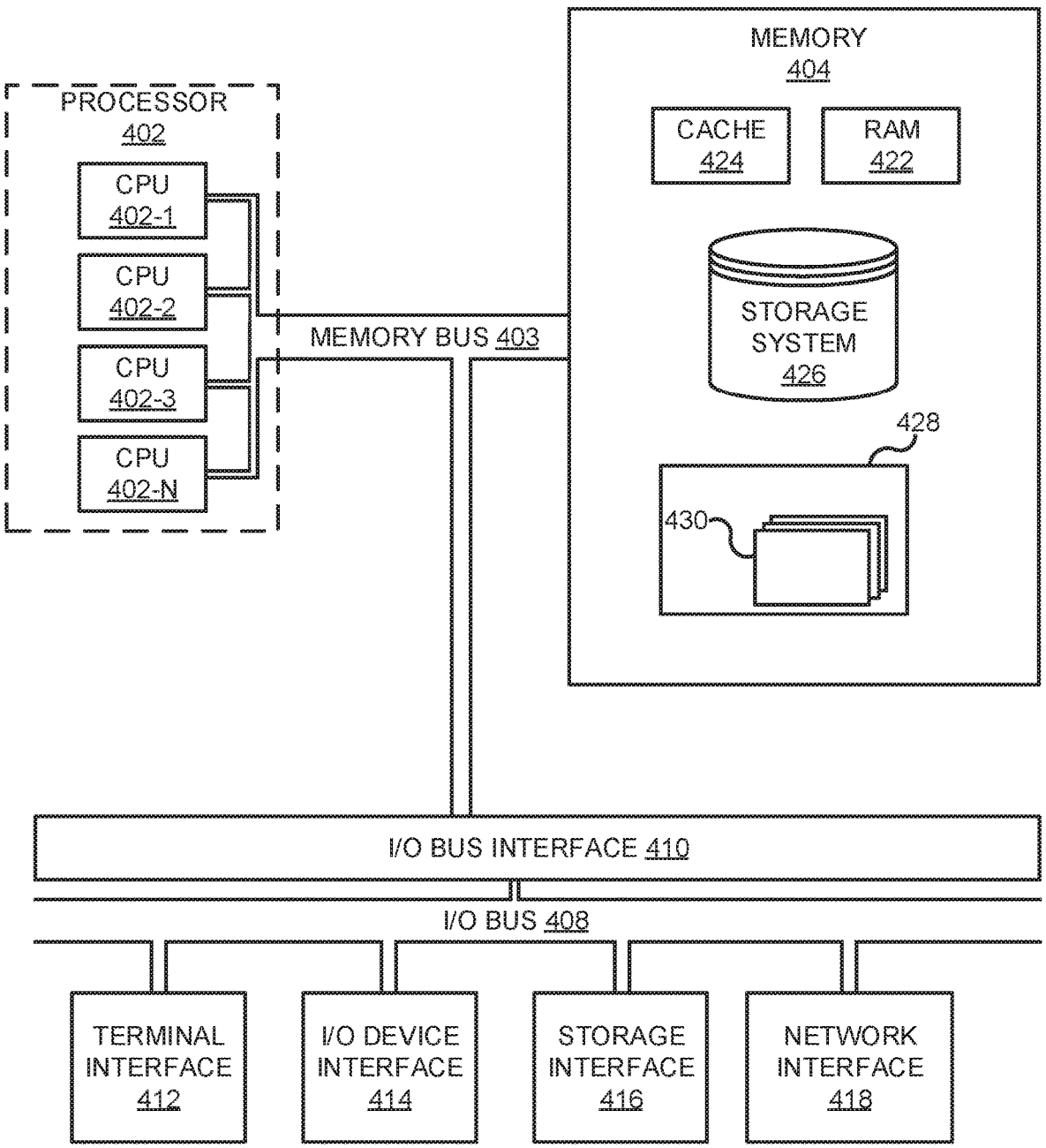
FIG. 4 is a high-level block diagram illustrating an example computer system that may be used in implementing one or more of the methods, tools, and modules, and any related functions, described herein, in accordance with embodiments of the present disclosure.

Referring now to FIG. 4, shown is a high-level block diagram of an example computer system 400 (e.g., the virtual machine pool management system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 401 may execute instructions stored in the memory 404 and may include one or more levels of on-board cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the virtual machine pool management system 100) may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
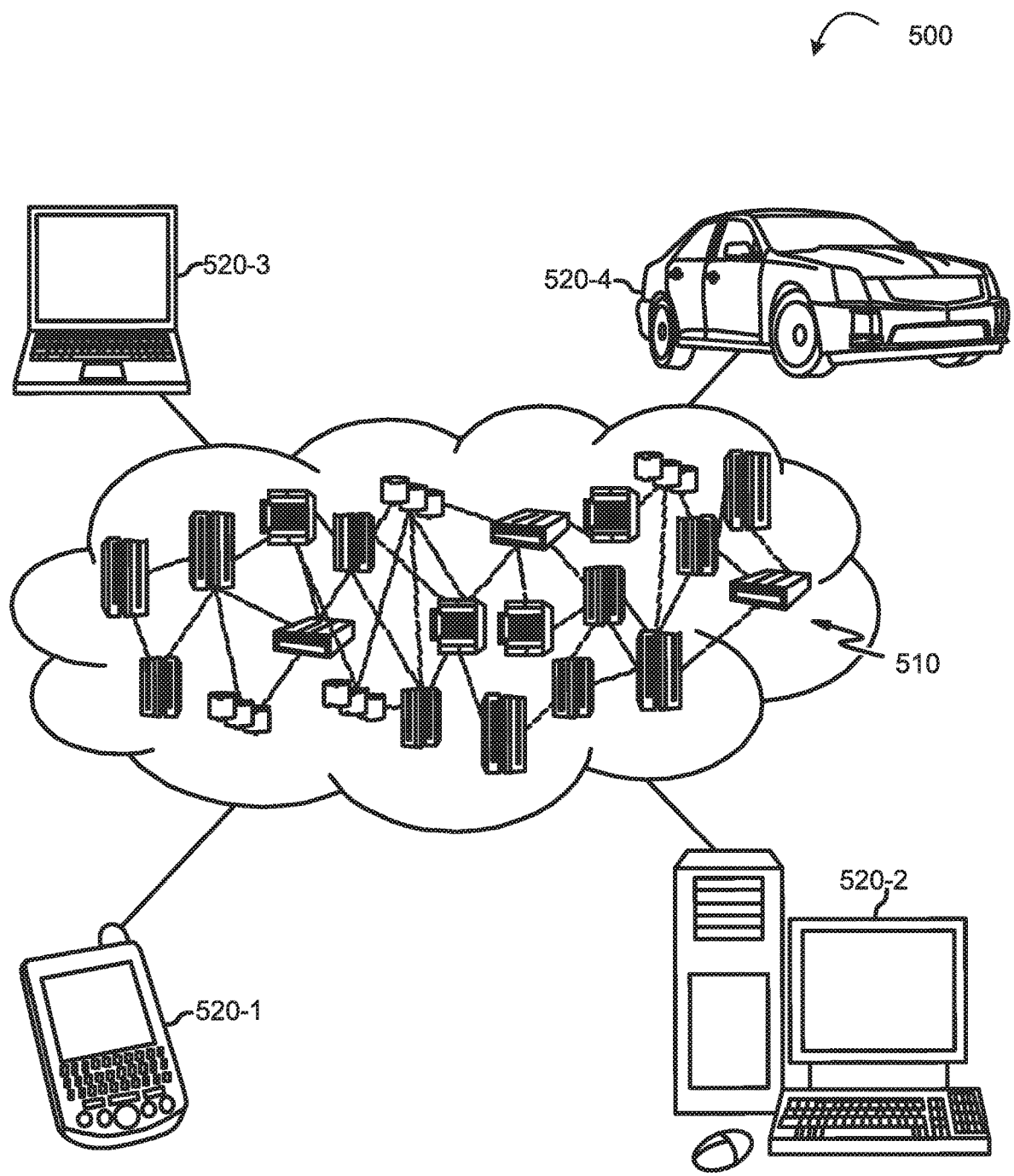
FIG. 5 depicts a cloud computing environment, in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
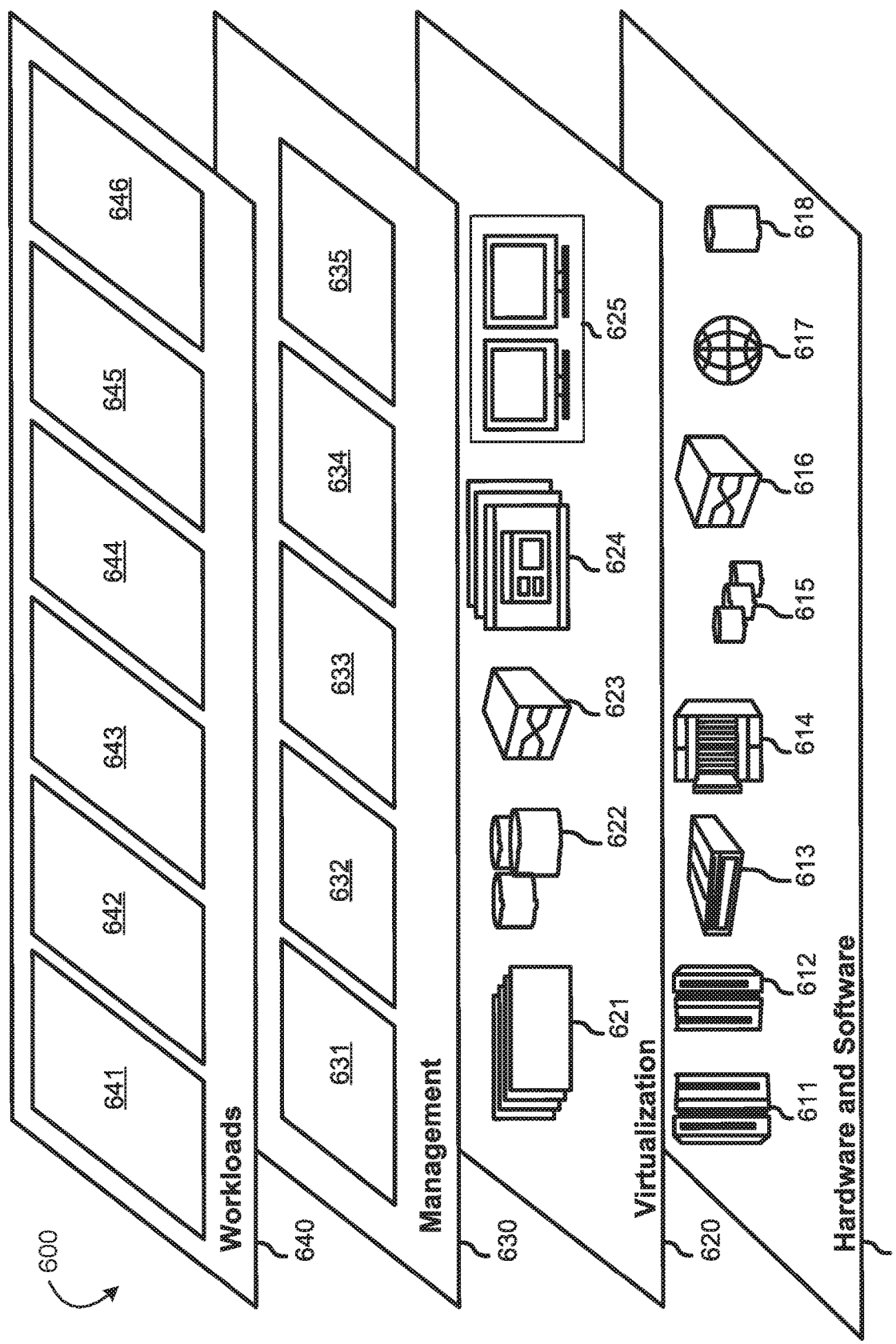
FIG. 6 depicts abstraction model layers, in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include mapping and navigation 641; software development and lifecycle management 642 (e.g., the virtual machine pool management system 100); virtual classroom education delivery 643; data analytics processing 644; transaction processing 645; and precision cohort analytics 646.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of pre-pooling a plurality of base virtual machines prior to in-vehicle application startup, the computer-implemented method comprising:
    reading a virtual machine pool manifest by a virtual machine pool manager, wherein the virtual machine pool manifest includes an initial number of virtual machines to launch;
    launching the plurality of base virtual machines into a virtual machine pool and based on the initial number prior to launching an application wherein the plurality of base virtual machines is launched prior to the in-vehicle application startup;
    allocating initial resources to a portion of the base virtual machines based on a virtual machine resource definition; and
    loading core program packages into the portion of the base virtual machines;
    and
    assigning the application to a first base virtual machine from the portion of the base virtual machines;
    wherein allocating the initial resources is based on a resource assignment pattern that mimics needs of an in-vehicle device to execute the application after the in-vehicle application startup; and
    wherein the application is assigned to the first base virtual machine prior to another application being assigned to a second base virtual machine that requires additional resources to run the another application.

2. The computer-implemented method of claim 1, wherein the assigning the application to a first base virtual machine from the portion of the base virtual machines is performed by an application life cycle manager and is based on an application type relating to the application, the method further comprising:
    launching the application in the first base virtual machine; and
    executing the application.

3. The computer-implemented method of claim 2, wherein;
    the assigning the application to the first base virtual machine is also based on the initial resources allocated to the first base virtual machine matching resources information of the application.

4. The computer-implemented method of claim 2, wherein launching the application comprises:
    loading an application logic relating to the application, wherein the application logic includes injection points;
    attaching the injection points to receptors included in the first base virtual machine; and
    reassigning resources to the first base virtual machine based on a resource information relating to the application.

5. The computer-implemented method of claim 1, wherein the plurality of base virtual machines other than the portion of the base virtual machines are placed into a wait configuration.

6. The computer-implemented method of claim 1, wherein the core program packages include a Java runtime environment.

7. The computer-implemented method of claim 1, wherein the application is an in-vehicle application.

8. The computer-implemented method of claim 7, wherein assigning the application to a first base virtual machine of the plurality of base virtual machines is also based on an urgency of the application to the in-vehicle device.

9. The computer-implemented method of claim 8, wherein an urgency of the application is greater if the application provides system diagnostics upon startup of a vehicle than if the application provides infotainment to a passenger of the vehicle.

10. A computer program product of pre-pooling a plurality of base virtual machines prior to application startup, the computer program product comprising:
    one or more computer readable storage media, and program instructions stored on the one or more computer readable storage media, the program instructions comprising:

program instructions to read a virtual machine pool manifest by a virtual machine pool manager, wherein the virtual machine pool manifest includes an initial number of virtual machines to launch;

program instructions to launch the plurality of base virtual machines into a virtual machine pool and based on the initial number prior to launching an application wherein the plurality of base virtual machines is launched prior to the application startup;

program instructions to allocate initial resources to a portion of the base virtual machines based on a virtual machine resource definition; and program instructions to load core program packages into the portion of the base virtual machines; and program instructions to assign the application to a first base virtual machine from the portion of the base virtual machines;

wherein the program instructions to allocate the initial resources is based on a resource assignment pattern that mimics needs of a device to execute the application after the application startup; and wherein the program instructions assign the application to the first base virtual machine prior to another application being assigned to a second base virtual machine that requires additional resources to run the another application.

11. The computer program product of claim 10, wherein the program instructions to assign the application to a first base virtual machine from the portion of the base virtual machines are performed by an application life cycle manager and are based on an application type relating to the application, the method further comprising:

program instructions to launch the application in the first base virtual machine; and program instructions to execute the application.

12. The computer program product of claim 11, wherein:
the program instructions to assign the application to the first base virtual machine are also based on the initial resources allocated to the first base virtual machine matching resources information of the application.

13. The computer program product of claim 11, wherein the program instructions to launch the application comprises:

program instructions to load an application logic relating to the application, wherein the application logic includes injection points;

program instructions to attach the injection points to receptors included in the base virtual machine; and program instructions to reassign resources to the first base virtual machine based on a resource information relating to the application.

14. The computer program product of claim 10, wherein the base virtual machines other than the portion of the base virtual machines are placed into a wait configuration.

15. The computer program product of claim 10, wherein the core program packages include a Java runtime environment.

16. The computer program product of claim 10, wherein the application is an in-vehicle application.

17. The computer program product of claim 16, wherein the program instructions to assign the application to a first base virtual machine of the plurality of base virtual machines is also based on an urgency of the application to the device.

18. A system for pre-pooling a plurality of base virtual machines prior to application startup, the system comprising:

a memory;
a processor;
a storage having stored thereon computer executable program code;
a virtual machine pool manager configured to launch the plurality of base virtual machines into a virtual machine pool, the virtual machine pool manager further configured to allocate initial resources to the base virtual machines and load core program packages onto the base virtual machines;
an application life cycle manager configured to assign applications to the base virtual machines; and
an application package manager configured to install and update the applications;
wherein the virtual machine pool manager, the application life cycle manager, and the application package manager are configured to launch the plurality of base virtual machines prior to the application startup;
wherein the initial resources are based on a resource assignment pattern that mimics needs of a device to execute the application after application startup; and
wherein the applications allocated to the base virtual machines are also based on the initial resources allocated to the base virtual machines matching resources information of the applications such that a first application is assigned to a first base virtual machine with initial resources that match resources information of the application prior to a second application being assigned to a second base virtual machine that requires additional resources to run the second application.

19. The system of claim 18, wherein a portion of the base virtual machines are placed into a wait configuration.

20. The system of claim 18, wherein:
the applications are vehicle applications; and
the application life cycle manager is further configured to assign the applications to the base virtual machines based on an urgency of the applications to the device.

* * * * *